United States Patent [19]

Kurtz et al.

[11] Patent Number: 4,513,623

[45] Date of Patent: Apr. 30, 1985

[54] TRANSDUCER HOUSING EMPLOYING CRIMPED LEADS

[75] Inventors: Anthony D. Kurtz, Englewood; Joseph R. Mallon, Jr., Franklin Lakes, both of N.J.

[73] Assignee: Kulite Semiconductor Products, Inc., Ridgefield, N.J.

[21] Appl. No.: 530,525

[22] Filed: Sep. 9, 1983

[51] Int. Cl.³ .................................................. G01L 9/06
[52] U.S. Cl. ........................................ 73/721; 73/756
[58] Field of Search ................. 73/721, 727, 723, 724, 73/725, 726, 728, 706, 756; 338/4

[56] References Cited

U.S. PATENT DOCUMENTS

| | | | |
|---|---|---|---|
| 3,247,719 | 4/1966 | Chelner | 73/726 |
| 3,305,818 | 2/1967 | Brueggeman et al. | 338/4 |
| 3,422,679 | 1/1969 | McGowan et al. | 73/706 |
| 3,968,694 | 7/1976 | Clark | 73/724 |
| 4,333,349 | 6/1982 | Mallon et al. | 73/708 |

*Primary Examiner*—Jerry W. Myracle
*Attorney, Agent, or Firm*—Arthur L. Plevy

[57] ABSTRACT

A transducer housing consists of a first and a second section. The first section contains an internal hollow into which a transistor header is mounted. The header, as mounted in the first section, is firmly secured within the section by means of a locking ring or other arrangement. Located in the internal hollow of the first section is a printed circuit board which has a plurality of apertures on the surface thereof each of which communicates with an extending tubular post on the opposite surface. Leads from the header are directed through the apertures in the printed circuit board and extend into the tubular posts. The second housing section is emplaced on the first section and contains a series of hollow metal tubular connectors or posts. These are inserted over the metal tubular posts of the header containing the leads and are crimped so that the posts of the transistor header as well as the leads are connected both electrically and mechanically to the tubular posts extending from the second housing section. Based on the above noted configuration, the housing sections serve to hold the transducer as mounted in the header in a firm and fixed position while enabling installation and interconnection of the transistor header in a rapid and simple manner based on the fact that the leads emanating from the header are crimped internally within the housing sections.

20 Claims, 3 Drawing Figures

4,513,623

TRANSDUCER HOUSING EMPLOYING CRIMPED LEADS

BACKGROUND OF THE INVENTION

This invention relates to a force transducer in general and more particularly to an improved housing configuration for a transducer.

As is well known, the pressure transducer is widely employed in many industrial applications and the manufacturers of such devices have attempted to produce a low-cost, reliable transducer which is accurate and economical to manufacture. A major problem in the assembly of such transducers is the connection of the leads to the transducer structure.

In particular, transducers employ piezoresistive devices as the strain or force elements and these transducers are associated with even greater problems in regard to lead connection. Such devices are small and are normally fabricated from silicon and employ extremely thin diaphragms. Based on these factors, coupling leads to such structures becomes a difficult problem as, if extreme care is not taken, the diaphragm may rupture and crack or the connections to the piezoresistive device may not be adequate. Since a transducer is operated in a pressure transmitting environment, the entire device is subjected to pressure fluctuations normally associated with vibration which causes the housing containing the transducer to be subjected to large shocks and forces which tend to break leads or destroy the device.

Generally, techniques developed by the integrated circuit industry to bond or couple leads from a silicon chip into a low-cost header or housing are well developed. These techniques are cheap and reliable but to be efficiently employed, must use conventional transistor hardware which in general is not suitable for use as a pressure transducer housing. Such hardware lacks suitable means for connecting pressure, and furthermore, the leads are not sufficiently rugged to withstand the above noted problems associated with pressure transducers.

It is, therefore, an object of the present invention to provide for the use of a transistor header housing a transducer which is positioned in a rugged yet inexpensive housing and employs a novel interconnection system which uses tubular crimped or crimped and welded interconnections.

It is a further object of the present invention to provide a low-cost pressure transducer which is incorporated in a rugged housing where the transducer device is further coupled to a connector or to external leads by means of crimped leads which provide excellent mechanical and electrical contact for the transducer device.

BRIEF DESCRIPTION OF THE PREFERRED EMBODIMENT

A transducer housing apparatus comprises a first housing section, said housing section having a internal bore extending from a first end to a second end with said bore having an opening at said first end and coaxial with a larger diameter transducer containing recess. A transistor header containing a piezoresistive transducer is positioned within said larger diameter recess and has a top surface facing said first end and in communication with said opening, the header has a base with leads emanating from the base as coupled to the piezoresistive transducer, locking ring means are contained in the larger diameter recess and exert a force to secure the header within the recess, a printed circuit board is positioned in the bore and underlies the base of the header, the bore has a plurality of apertures extending from a top to a bottom surface with each aperture surrounded by a tubular post extending from the bottom surface, the leads from the header are directed through the apertures into the posts, a welded hollow housing section is coupled to the first section and the second section has tubular interconnecting members depending therefrom which members are inserted into respective ones of the tubular posts so that the posts, members, and leads are crimped to provide a rigid mechanical and electrical contact.

DETAILED DESCRIPTION OF THE FIGURES

Figure 1:
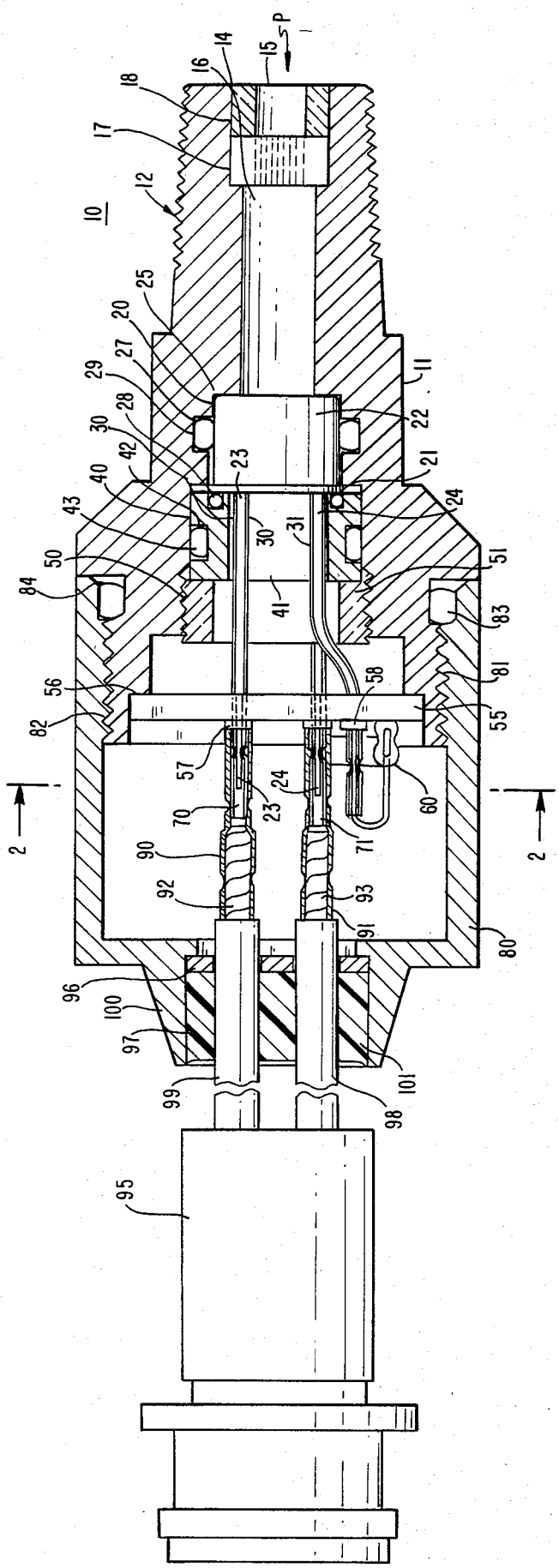
FIG. 1 is a detailed cross sectional view of a transducer housing employing crimped leads according to this invention.

Referring to FIG. 1, there is shown a cross sectional view of a transducer housing arrangement 10 according to this invention. Essentially, all the components which constitute the housing are cylindrical in shape. The cross sectional view is indicative of the major structural aspects of the transducer housing assembly.

The transducer housing consists of a first housing section 11 which essentially has a front threaded end 12. The threaded end 12 is adapted to be inserted into a threaded aperture so that the front surface is subjected to the pressure environment P. The housing section 11 contains a front opening 15 which is in contact with the pressure environment. The front opening 15 is associated with a longitudinal bore 16.

The bore 16 has a front section near opening 15 of a larger diameter. Into the front section is inserted a snubber 17 which is held in place by means of a retaining ring 18. Essentially, the snubber 17 is a mesh device or a screen having a plurality of apertures of a given diameter and the purpose and function is to prevent particles which are present in the pressure transmitting environment to enter the bore 16 where they may impinge upon or destroy the semiconductor diaphragm. The use of the snubber 17 allows the silicon chip contained in the header to be used while providing excellent protection from particle impingement.

It has also been found that the aperture dimensions of the snubber 17 may be adjusted to provide protection from transient over pressure such as those which may be introduced in hydraulic applications.

The semiconductor transducer is contained within a transistor type package or header 20 which, for example, may be a TO-5 or TO-8 package or header or other device.

Transducer configurations are known in the art and an example of such a device is given by referring to U.S. Pat. No. 3,924,322 entitled ECONOMICAL PRESSURE TRANSDUCER ASSEMBLIES, METHODS OF FABRICATING AND MOUNTING THE SAME, issued on Dec. 9, 1975 to A. D. Kurtz, et al and assigned to the assignee herein.

The device 20 constitutes a pressure transducer where a transistor housing is employed to support the piezoresistive device and provide suitably convenient lead wires and pressure connections. The transistor housing consists of a base 21 with a cylindrical top portion 22. Leads emanating from the base such as 23 and 24 are internally connected to the bridge configuration contained within the housing 20. The use of a pressure transducer such as a semiconductor Wheatstone bridge contained in a transistor housing as 20 is a very economical and convenient way of packaging a transducer. The transducer header 20 is contained within a recess provided in Section 11 for accommodating the cylindrical portion 22 of the housing.

As seen in FIG. 1, the bore 16 opens to a larger diameter at section 25 which section has a front peripheral groove 27. Located in the groove 27 is an O-ring 29. The O-ring 29 is fabricated from an elastomeric material and abuts against the cylindrical surface of the transducer header 20 within the hollow to retain the header in a fixed position with respect to the bore.

As indicated, leads which are part of the transistor header extend from the base plate and are surrounded by insulating tubes as 30 and 31. In order to further secure the header 20 within the aperture, a annular ring 40 is shown. The ring 40 has a central aperture 41 through which the leads 23 and 24 are directed. The annular ring 40 has a peripheral groove 42 and a top groove 30 which groove abuts against the bottom surface of the base 21 of the header 20. The annular ring 40 is inserted into housing section 11 and positioned against the base 21. An O-ring 43 is positioned within groove 42 to provide further pressure sealing. As indicated, the annular ring 40 also has a top groove 28 into which is inserted an O-ring 30 which O-ring presses against the base of header 20 to further secure the same within the recess.

The housing section 11 contains a further internally threaded portion 50 into which portion a threaded locking ring 51 is positioned. The ring 51 abuts against the annular ring 40 and serves to firmly hold the transducer header 20 within the cavity of the housing section 11. It has been found that the above sealing arrangement is extremely inexpensive and effective. Pressures in excess of 1,000 psi can be measured with this arrangement. Other arrangements are possible and are considered to be within the scope of this invention. For example, the header 20 may be welded directly into the housing 11 by resistance welding or other means. If a weld is employed, this will eliminate the need for the annular ring 40 and the locking ring 50. The leads 23 and 24 as emanating from the base 21 as indicated are surrounded by insulating tubes 30 and 31 such as Teflon tubes and are directed to a printed circuit board 55. The board 55 is positioned within a step portion 56 of the housing section 11. The printed circuit board contains a plurality of apertures on a top surface one for each lead. The leads as 23 and 24 are directed through the apertures in the board 56. Coupled to the underside of the board 56 are extending tubular posts as 70 and 71 into which the non-insulated leads 23 and 24 are inserted. Essentially, the leads 23 and 24 must be electrically connected to the printed circuit board and in the configuration shown these leads are inserted through the apertures into the tubular posts 70 and 71.

In any event, the printed circuit board may have terminal areas on the top surface which terminal areas as 57 are in contact with extending solid posts in lieu of tubular posts. In such a configuration, the leads 23 and 24 would be soldered or bonded to the terminal areas. In this case the terminals as 57 and 58 would not be tubular but would be extending posts.

In any event, the wires 23 and 24 are inserted into the hollow tubes 70 and 71.

Figure 2:
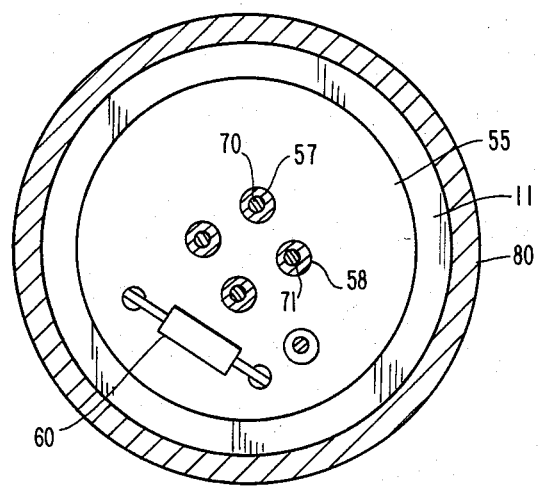
FIG. 2 is a sectional view taken through line 2—2 of FIG. 1.

Referring to FIG. 2, there is shown a sectional view depicting the board 55 in position in housing section 11 with the areas 57 and 58 shown. The printed circuit board 55 may also contain a compensating resistor such as resistor 60 which is used as a series resistor for the transducer assembly contained in housing 20. The resistor 60 is connected typically in series with one excitation output lead of the bridge circuit contained within the header 20.

This resistor 60 may be soldered to the board by conventional means or preferably it may be crimped within the tubular members such as 57 and 58. In a typical embodiment, since a low-cost structure is desired, it is incumbent to use a minimum of compensating and normalizing components chosen with a minimum amount of testing and yet providing good performance. See for example U.S. Pat. No. 4,333,349 entitled BINARY BALANCING APPARATUS FOR SEMICONDUCTOR TRANSDUCER STRUCTURES, issued on June 8, 1982 to J. R. Mallon, Jr. et al and assigned to the assignee herein.

This patent describes binary balancing techniques which are pertinent to this aspect. It has been found posible to use a single resistor 60 as shown. The purpose of this resistor is to normalize the pressure sensitivity of the bridge. This simple scheme along with the low-cost package concept allows the production of a transducer which maintains reliable interconnection and production techniques while providing a rugged package and lead wires required for use in typical transducer applications.

Figure 3:
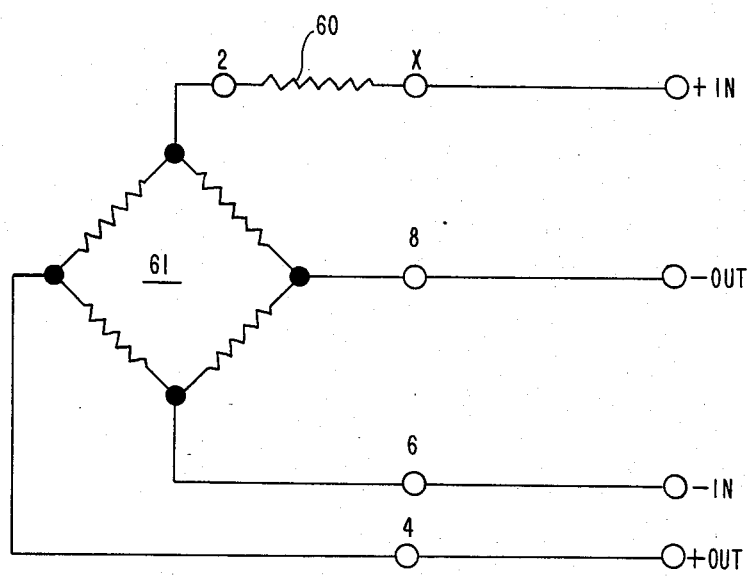
FIG. 3 is a schematic view of a transducer assembly as contained within a transistor header according to this invention.

Referring to FIG. 3, there is shown a schematic diagram of the bridge configuration contained within header 20. A transducer bridge 61 contains four resistors in a Wheatstone brige configuration. As seen in FIG. 3, there are four output leads designated as 2, 4, 6, and 8. All the leads are connected to leads as 23 and 24 emanating from the transistor page 21, while lead 2 is connected to one terminal of resistor 60 with the other terminal of resistor 60 connected to lead X in the printed circuit board 55. The printed circuit board has relatively large extending metal tubular posts as 70 and 71 which extend from the bottom of board as shown. The printed circuit board 55 is emplaced within the flange section 56 of the housing section 11 and retained therein by means of an epoxy or other suitable glue.

In order to complete the transducer assembly, a second housing section 80 has an internal thread 81 which mates with an outer thread 82 on housing section 11. A peripheral groove 84 is formed at the top portion where housing 80 meets with housing 11 and an O-ring 83 provides a water tight and pressure tight seal when the housing sections 80 and 11 are mated.

The housing section 80 contains a series of metal tubular posts or contacts as 90 and 91 which are directed and inserted over the metal posts 70 and 71 emanating from the printed circuit board 55. These posts further contain wires as 92 and 93 which wires are directed from the housing section 80 to an end connector 95. Contacts 90 and 91 may have a varying diameter to accommodate different diameter leads and terminal pins. A particular connector 95 may be a conventional 4-terminal connector such as those manufactured by ITT Cannon and designated as the SS4P. While a connector is shown, it is understood that leads as 98 and 99 could be brought out without the use of a connector.

The hollow metal tubular members 90 and 91 are crimped onto the terminal post members 70 and 71 by means of a crimping tool and are crimped at typically two places to form an extremely tight mechanical and electrical bond. Alternatively, the pins may be crimped and welded for a more secure joint or they may be welded by means of an ultrasonic or spot welding technique. It is, of course, understood that the crimping allows contact between posts 70 and 90 while also making contact with the wire as 23 positioned within the hollow post 70. After crimping takes place, a base support plate 96 is positioned within the output aperture 97 of the housing section 80. The base plate 96 contains suitable apertures for accommodating the wires or leads 92 and 93. These wires retain their insulation outside the housing and are designated by numerals 98 and 99. The member 96 serves to locate the lead wires and also forms a base to allow the cavity 97 to be back-filled with epoxy forming a water tight seal for use in difficult environments as in measuring systems and military applications.

The housing section 80 has an extending central conical section 100 which is as indicated filled with epoxy to firmly secure the base plate 96 and to hold the wires in place. It should be noted that the printed circuit board shown is a conventional method for securing terminals and for positioning compensating resistors. However, for economy, the leads as 90 and 93 may be secured directly to the leads 23 and 24 by means of the tubes such as 90 and 91.

As seen from the above, the transducer housing depicted in FIG. 1 is an extremely rugged device. Essentially, the transistor type header 20 is retained securely within housing section 11 by means of the O-rings 29 and 30 which are inserted in the respective grooves. The transducer header 20 is further supported by means of the locking rings 40 and 51. Leads emanating from the transducer header 20 are directed to the printed circuit board 55 and are inserted within the extending tubular posts of a relatively large diameter. These posts accommodate the tubular metal contacts as 90 and 91 which are then crimped to the posts to form a good mechanical and electrical bond. In regard to the configuration, the transistor header 20 is rigidly secured within the housing section 11 and as positioned cannot vibrate or move. Thus, the transducer assembly depicted is extremely reliable and rugged and enables fabrication of the parts due to the fact that once the section 11, as including the transducer header 20, is completed, it can be rapidly and permanently secured to the connector assembly 95 via the crimped lead arrangement as depicted.

We claim:

1. A transducer housing apparatus, comprising,
    a first housing section, said housing section having an internal bore extending from a first end to a second end with said bore having an opening at said first end and coaxial with a larger diameter transducer containing recess,
    a transducer header located within said larger diameter recess and having a top surface facing said first end and in communication with said opening and having a bore with leads emanating from said bore, locking means coupling said header within said housing section,
    a second hollow housing section coupled to said first section and having tubular contact members depending therefrom into which members said leads are inserted to be crimped within said tubular contact members.

2. The transducer housing apparatus according to claim 1 further including a printed circuit board positioned in said bore and underlying said base of said header, said board having extending tubular posts with openings to receive said leads from said base of said header and for insertion of said tubular posts within said tubular contact members.

3. The transducer housing apparatus according to claim 1, wherein said first housing section has a peripheral outer threaded section near said second end, with said second housing section having a corresponding internal thread for coupling said sections together, with said sections as coupled forming an outer peripheral groove at the outer edge and an O-ring inserted in said groove.

4. The transducer housing apparatus according to claim 1, wherein said larger diameter recess has a peripheral groove directed about the surface of said recess, with said transducer housing surrounded by said groove, with an O-ring in said groove of said housing coacting with said cylindrical surface of said housing.

5. The transducer housing apparatus according to claim 1, wherein said locking ring means comprises a first annular ring having an outer groove and positioned within said large diameter recess with a top surface coacting with said base plate, with an O-ring located in said outer groove, a second annular ring having a threaded outer diameter located in said large diameter recess with said recess being internally threaded to accommodate said second ring to cause said second ring to exert a force on said first ring for securing said transducer header in said first housing section.

6. The transducer housing apparatus according to claim 1, wherein said tubular contact members have the other ends coupled to wire leads directed out of said second housing section, with a connector coupled to said leads.

7. The transducer housing apparatus according to claim 1, wherein said transducer header contains a piezoresistive bridge array with terminals of said bridge connected to respective leads emanating from said base plate.

8. The transducer housing apparatus according to claim 7, wherein said printed circuit board includes a compensating resistor coupled between said terminal areas to provide a series resistance for said bridge array.

9. The transducer housing apparatus according to claim 1, wherein said bore has a larger diameter section near said front end with a pressure snubber located within said larger diameter section.

10. The transducer housing apparatus according to claim 9, wherein said pressure snubber has a plurality of apertures directed through the same and coaxial with said bore to prevent particles above a given diameter to enter said base.

11. The transducer housing apparatus according to claim 1, wherein said transducer header is a transistor header having a top hollow cylindrical section coupled to a bottom base plate, with said base plate having said leads emanating therefrom and with a piezoresistive bridge array contained within said hollow cylindrical section with terminals of said bridge array connected to said leads.

12. The transducer housing apparatus according to claim 1, wherein said first housing section has a stepped outer cylindrical configuration, with a first end section being of a given diameter and coaxial with a central section of a larger diameter and an outer end section of still a larger diameter.

13. The transducer housing apparatus according to claim 1, wherein the outer surface of said first section is threaded.

14. The transducer housing apparatus according to claim 1, wherein said O-ring is fabricated from an elastomeric material.

15. A transducer housing apparatus, comprising:
a first housing section, said housing section having a stepped bore directed from a first end to a second end with said bore having an opening at said first end and coaxial with a larger diameter transducer containing recess,
a tranducer header of a cylindrical configuration located within said larger diameter recess and having a top surface facing said first end and in communication with said opening and having a base with leads emanating from said base, locking ring means contained in said larger diameter recess and exerting a force on said base to rigidly secure said transducer header therein, a printed circuit board positioned in said bore and underlying said base, said board having apertures on a first surface each surrounded by an extending tubular post on a second surface, with said leads as emanating from said base directed within one of said respective tubular posts on said board,
a second hollow housing section coupled to said first section said second section having tubular contact members depending therefrom with one end for insertion into respective ones of said posts with said tubular contact member crimped in contact with said posts and said leads therein to provide a rigid mechanical and electrical contact.

16. The transducer housing apparatus according to claim 15, wherein said locking ring means comprises a first annular ring having an outer groove and positioned within said large diameter recess with a top surface coacting with said base plate, with an O-ring located in said outer groove, a second annular ring having a threaded outer diameter located in said large diameter recess with said recess being internally threaded to accommodate said second ring to cause said second ring to exert a force on said first ring for securing said transducer header in said first housing section.

17. The transducer housing apparatus according to claim 15, wherein said tubular contact members have the other ends coupled to wire leads directed out of said second housing section, with a connector coupled to said leads.

18. The transducer housing apparatus according to claim 17, wherein said printed circuit board includes a compensating resistor coupled between said terminal areas to provide a series resistance for said bridge array.

19. The transducer housing apparatus according to claim 15, wherein said bore has a larger diameter section near said front end with a pressure snubber located within said larger diameter section.

20. The transducer housing apparatus according to claim 19, wherein said pressure snubber has a plurality of apertures directed through the same and coaxial with said bore to prevent particles above a given diameter to enter said base.

* * * * *